(12) United States Patent
Thorne

(10) Patent No.: US 11,383,623 B2
(45) Date of Patent: Jul. 12, 2022

(54) SUPPORT PLATFORM WITH LOAD LEG FOR CHILD CAR SEAT

(71) Applicant: Safest Seats LLC, Sewickley, PA (US)

(72) Inventor: Henry F. Thorne, Sewickley, PA (US)

(73) Assignee: Safest Seats LLC, Sewickley, PA (US)

(*) Notice: Subject to any disclaimer, the term of this patent is extended or adjusted under 35 U.S.C. 154(b) by 0 days.

(21) Appl. No.: 17/263,280

(22) PCT Filed: Jul. 24, 2019

(86) PCT No.: PCT/US2019/043192
§ 371 (c)(1),
(2) Date: Jan. 26, 2021

(87) PCT Pub. No.: WO2020/023609
PCT Pub. Date: Jan. 30, 2020

(65) Prior Publication Data
US 2021/0309131 A1    Oct. 7, 2021

Related U.S. Application Data

(60) Provisional application No. 62/703,912, filed on Jul. 27, 2018.

(51) Int. Cl.
*B60N 2/28* (2006.01)

(52) U.S. Cl.
CPC ......... *B60N 2/2824* (2013.01); *B60N 2/2884* (2013.01); *B60N 2/2863* (2013.01)

(58) Field of Classification Search
CPC .. B60N 2/2824; B60N 2/2863; B60N 2/2884; B60N 2/2827; B60N 2/2821
(Continued)

(56) References Cited

U.S. PATENT DOCUMENTS 5,549,353 A   8/1996  Gaudet et al.
5,820,215 A   10/1998 Dreisbach
(Continued)

FOREIGN PATENT DOCUMENTS

CA    2328478 A1     6/2001
EP    0485121 A1 *  5/1992  ........... B60N 2/2875
(Continued)

OTHER PUBLICATIONS

International Search Report and Written Opinion issued in PCT/US2019/043192 dated Jul. 24, 2019.

*Primary Examiner* — Milton Nelson, Jr.
(74) *Attorney, Agent, or Firm* — The Webb Law Firm

(57) ABSTRACT

A support platform for a child car seat includes a carrier base configured to support a child car seat and a load leg pivotally attached to the carrier base about a hinge point to allow angular displacement between the load leg and the carrier base. The load leg includes a leg member having a first end pivotally connected to the carrier base at the hinge point, and a foot extending from a second end of the leg member and having a bottom surface configured to frictionally engage a floor of the vehicle at a contact point defined along the foot. A leg axis through the hinge point of the load leg and the contact point of the foot defines a load leg angle of between substantially 10° and substantially 25° relative to an axis extending substantially perpendicular to the floor of the vehicle.

20 Claims, 7 Drawing Sheets

(58) Field of Classification Search
USPC .............. 297/256.16, 463.1; 16/43, 17.1
See application file for complete search history.

(56) References Cited

U.S. PATENT DOCUMENTS

| | | | |
|---|---|---|---|
| 6,322,142 B1* | 11/2001 | Yoshida | B60N 2/2806 297/250.1 |
| 6,561,588 B1 | 5/2003 | Brady | |
| 6,817,665 B2 | 11/2004 | Pacella et al. | |
| 6,834,915 B2 | 12/2004 | Sedlack | |
| 7,097,245 B2 | 8/2006 | Barker | |
| 7,328,946 B2 | 2/2008 | Hendrikus Van Montfort et al. | |
| 7,364,213 B2 | 4/2008 | Romolo | |
| 7,422,278 B2 | 9/2008 | McConnell et al. | |
| 7,464,990 B2 | 12/2008 | Collias | |
| 7,467,825 B2 | 12/2008 | Jane Santamaria | |
| 7,753,445 B2 | 7/2010 | Kassai et al. | |
| 8,061,773 B2* | 11/2011 | Collias | B60N 2/2806 297/256.16 |
| 8,998,317 B2 | 4/2015 | Guo | |
| 9,089,219 B2 | 7/2015 | Lee | |
| 9,315,123 B2 | 4/2016 | Guo | |
| 9,365,145 B2* | 6/2016 | Millasseau | B60N 2/28 |
| 2004/0036331 A1* | 2/2004 | Jonasson | B60N 2/286 297/250.1 |
| 2006/0012234 A1 | 1/2006 | Collias | |
| 2006/0055218 A1 | 3/2006 | Barker | |
| 2008/0079293 A1 | 4/2008 | Hedges et al. | |
| 2008/0179926 A1 | 7/2008 | Kushner | |
| 2008/0303321 A1 | 12/2008 | Powell | |
| 2008/0315647 A1 | 12/2008 | Carine | |
| 2009/0224591 A1 | 9/2009 | Langhorn | |
| 2009/0273215 A1* | 11/2009 | Barker | B60N 2/2887 297/253 |
| 2014/0001800 A1 | 1/2014 | Mo | |
| 2014/0354021 A1 | 12/2014 | Sedlack | |
| 2016/0200225 A1 | 7/2016 | Van Der Veer et al. | |
| 2016/0332542 A1 | 11/2016 | Cohen et al. | |
| 2016/0368401 A1 | 12/2016 | Sedlack | |

FOREIGN PATENT DOCUMENTS

| | | |
|---|---|---|
| EP | 0791500 A2 | 8/1997 |
| EP | 0813992 A2 | 12/1997 |
| EP | 1953033 A1 | 8/2008 |
| EP | 2551150 A2 | 1/2013 |
| EP | 2664491 A1 | 11/2013 |
| FR | 2957564 A1 | 9/2011 |
| FR | 3002886 A1 | 9/2014 |
| FR | 3010354 A3 | 3/2015 |
| GB | 2423016 A | 8/2006 |
| GB | 2423705 A | 9/2006 |
| GB | 2524309 A | 9/2015 |
| WO | 2015040068 A1 | 3/2015 |

* cited by examiner

SUPPORT PLATFORM WITH LOAD LEG FOR CHILD CAR SEAT

CROSS-REFERENCE TO RELATED APPLICATIONS

The application is the United States national phase of International Application No. PCT/US2019/043192 filed Jul. 24, 2019, and claims the benefit of U.S. Provisional Application No. 62/703,912 filed Jul. 27, 2018, the disclosures of which are hereby incorporated by reference in their entirety.

BACKGROUND OF THE INVENTION

Field of the Invention

The present invention is generally directed to a support platform for a child car seat for use in an automobile and, more particularly, to a support platform including a load leg.

Description of Related Art

The purpose of a child car seat or a child restraint system(s) (CRS) is to retain children in the event of an automobile crash, thereby preventing or at least mitigating injury. Modern automobiles are designed with crumple zones, which, as the name implies, allow the frame and body of the automobile to crumple or buckle during a crash. The crumple zones thus function as shock absorbers that allow the portion of the automobile rearward of the crumple zone to decelerate at a controlled rate. In crash simulations performed by Consumer Reports® and designed to mimic a frontal impact with an immovable vertical surface at 35 miles per hour, the peak deceleration experienced by the automobile rearward of the crumple zones was approximately 35 gs (where one "g" is equal to the acceleration imparted on an object due to Earth's gravity).

Ideally, occupants of the automobile, including children, would be rigidly connected to the frame of the automobile to attain the benefit of controlled deceleration imparted by the crumple zone. In reality, it is not possible to rigidly connect children to the automobile frame in this manner, and conventional CRS fall well short of this ideal. In the same Consumer Reports® simulations noted above, the top rated commercially available CRS experienced a peak deceleration of 120 gs. As is evident from these simulation results, a child restrained in a conventional CRS will experience deceleration of between three and four times the deceleration of the automobile frame during a frontal crash at 35 miles per hour. The increase in peak deceleration is due to the inherent slack in the connection between the child, the CRS, and/or, the automobile seat, which allows the child to decelerate at an uncontrolled rate not tethered to the deceleration of the automobile frame. Thus, the child may move forward relative to the automobile frame until the slack is taken up, at which point the child will be forced to rapidly decelerate to match the deceleration of the automobile frame. That is, while the automobile frame decelerates at a controlled rate beginning at the initial impact, the controlled deceleration of the child does not begin until the slack has been taken up by displacement of the child relative to the automobile frame. As such, the child has less time to decelerate than the automobile frame, resulting in an increased rate of deceleration.

The deceleration experienced during a crash may alone be sufficient to cause significant injury, particularly head trauma. However, injury risk and severity may be exacerbated if the slack between the child and the automobile frame is sufficient to allow the child and/or the CRS to impact a structure forward of the CRS, such as a front seat of the automobile.

In view of these deficiencies, there exists a need for a device that more rigidly connects a child to an automobile frame, or for a device that otherwise reduces the deceleration experienced by the child in the event of an automobile crash.

SUMMARY OF THE INVENTION

Aspects of the present disclosure are directed to a support platform for a child car seat. The support platform includes a carrier base configured to support the child car seat in a seat of a vehicle and a load leg pivotally attached to the carrier base about a hinge point to allow a predetermined range of angular displacement between the load leg and the carrier base. The load leg includes a leg member having a first end and a second end, the first end of the leg member pivotally connected to the carrier base at the hinge point, and a foot extending from the second end of the leg member and having a bottom surface configured to frictionally engage a floor of the vehicle at a contact point defined along the bottom surface of the foot. A leg axis through the hinge point of the load leg and the contact point of the foot defines a load leg angle of between substantially 10° and substantially 25° relative to an axis extending substantially perpendicular to the floor of the vehicle.

In some aspects, the bottom surface of the foot is curved, and angular displacement of the load leg relative to the carrier base changes the contact point along the bottom surface of the foot.

In some aspects, the load leg angle varies no more than 5° throughout predetermined range of angular displacement.

In some aspects, the bottom surface of the foot has a radius of curvature substantially equally to a linear distance between the hinge point and the contact point of the foot.

In some aspects, the foot is rigidly connected to or integrally formed with the leg member.

In some aspects, the leg member includes a curved portion such that the first end of the leg member extends at least partially over the seat of the vehicle and such that the leg axis extends through at least a portion of the seat of the vehicle.

In some aspects, the bottom surface of the foot includes a tread to increase friction between the foot and the floor of the vehicle.

In some aspects, the support platform further includes a visual indicator to confirm to a user that the load led angle is between 10° and 25°.

In some aspects, the contact point of the foot is located forward of the hinge point in a horizontal direction relative to a bight of the seat of the vehicle.

In some aspects, an angle defined about the hinge point between the carrier base and the leg axis is such that horizontal movement of the carrier base towards the foot causes the hinge point to shift upwards relative to the floor of the vehicle.

In some aspects, the height of the hinge point relative to the floor of the vehicle is adjustable by rotating the load leg about the hinge point relative to the carrier base.

In some aspects, the foot extends from the second end of the leg member in a horizontal direction away from the hinge point.

In some aspects, the load leg elevates at least a portion of the carrier base above at least a portion of the vehicle seat such that at least a portion of the weight of the child car seat is applied to the load leg.

In some aspects, the support platform further includes an indicator to confirm that a gap is present between at least a portion of the carrier base and the seat of the vehicle.

In some aspects, the carrier base includes a lip for retaining the child car seat.

Other aspects of the present disclosure are directed to a support platform for a child car seat. The support platform includes a carrier base configured to support the child car seat in a seat of a vehicle and a load leg pivotally attached to the carrier base about a hinge point to allow a predetermined range of angular displacement between the load leg and the carrier base. The load leg includes a leg member having a first end and a second end, the first end of the leg member pivotally connected to the carrier base at the hinge point, and a foot extending from the second end of the leg member and having a bottom surface configured to frictionally engage a floor of the vehicle at a contact point defined along the bottom surface of the foot. Angular displacement of the load leg relative to the carrier base changes the contact point along the bottom surface of the foot. The load leg angle varies no more than 5° throughout predetermined range of angular displacement.

In some aspects, a leg axis through the hinge point of the load leg and the contact point of the foot defines a load leg angle of between substantially 10° and substantially 25° relative to an axis extending substantially perpendicular to the floor of the vehicle.

In some aspects, the leg member includes a curved portion such that the first end of the leg member extends at least partially over the seat of the vehicle and such that the leg axis extends through at least a portion of the seat of the vehicle.

In some aspects, the contact point of the foot is located forward of the hinge point in a horizontal direction relative to a bight of the seat of the vehicle.

In some aspects, the load leg elevates at least a portion of the carrier base above at least a portion of the vehicle seat such that at least a portion of the weight of the child car seat is applied to the load leg.

Further aspects of the present disclosure are set forth in the following numbered clauses:

Clause 1. A support platform for a child car seat comprising: a carrier base configured to support the child car seat in a seat of a vehicle; and a load leg pivotally attached to the carrier base about a hinge point to allow a predetermined range of angular displacement between the load leg and the carrier base, the load leg comprising: a leg member having a first end and a second end, the first end of the leg member pivotally connected to the carrier base at the hinge point; and a foot extending from the second end of the leg member and having a bottom surface configured to frictionally engage a floor of the vehicle at a contact point defined along the bottom surface of the foot, wherein a leg axis through the hinge point of the load leg and the contact point of the foot defines a load leg angle of between substantially 10° and substantially 25° relative to an axis extending substantially perpendicular to the floor of the vehicle.

Clause 2. The support platform of clause 1, wherein the bottom surface of the foot is curved, and wherein angular displacement of the load leg relative to the carrier base changes the contact point along the bottom surface of the foot.

Clause 3. The support platform of clause 1 or 2, wherein the load leg angle varies no more than 5° throughout predetermined range of angular displacement.

Clause 4. The support platform of any of clauses 1 to 3, wherein the bottom surface of the foot has a radius of curvature substantially equally to a linear distance between the hinge point and the contact point of the foot.

Clause 5. The support platform of any of clauses 1 to 4, wherein the foot is rigidly connected to or integrally formed with the leg member.

Clause 6. The support platform of any of clauses 1 to 5, wherein the leg member comprises a curved portion such that the first end of the leg member extends at least partially over the seat of the vehicle and such that the leg axis extends through at least a portion of the seat of the vehicle.

Clause 7. The support platform of any of clauses 1 to 6, wherein the bottom surface of the foot comprises a tread to increase friction between the foot and the floor of the vehicle.

Clause 8. The support platform of any of clauses 1 to 7, further comprising a visual indicator to confirm to a user that the load led angle is between 10° and 25°.

Clause 9. The support platform of any of clauses 1 to 8, wherein the contact point of the foot is located forward of the hinge point in a horizontal direction relative to a bight of the seat of the vehicle.

Clause 10. The support platform of any of clauses 1 to 9, wherein an angle defined about the hinge point between the carrier base and the leg axis is such that horizontal movement of the carrier base towards the foot causes the hinge point to shift upwards relative to the floor of the vehicle.

Clause 11. The support platform of any of clauses 1 to 10, wherein the height of the hinge point relative to the floor of the vehicle is adjustable by rotating the load leg about the hinge point relative to the carrier base.

Clause 12. The support platform of any of clauses 1 to 11, wherein the foot extends from the second end of the leg member in a horizontal direction away from the hinge point.

Clause 13. The support platform of any of clauses 1 to 12, wherein the load leg elevates at least a portion of the carrier base above at least a portion of the seat of the vehicle such that at least a portion of the weight of the child car seat is applied to the load leg.

Clause 14. The support platform of any of clauses 1 to 13, further comprising an indicator to confirm that a gap is present between at least a portion of the carrier base and the seat of the vehicle.

Clause 15. The support platform of any of clauses 1 to 14, wherein the carrier base comprises a lip for retaining the child car seat.

Clause 16. A support platform for a child car seat comprising: a carrier base configured to support the child car seat in a seat of a vehicle; and a load leg pivotally attached to the carrier base about a hinge point to allow a predetermined range of angular displacement between the load leg and the carrier base, the load leg comprising: a leg member having a first end and a second end, the first end of the leg member pivotally connected to the carrier base at the hinge point; and a foot extending from the second end of the leg member and having a bottom surface configured to frictionally engage a floor of the vehicle at a contact point defined along the bottom surface of the foot, wherein angular displacement of the load leg relative to the carrier base changes the contact point along the bottom surface of the foot, and wherein the load leg angle varies no more than 5° throughout predetermined range of angular displacement.

Clause 17. The support platform of clause 16, wherein a leg axis through the hinge point of the load leg and the contact point of the foot defines a load leg angle of between substantially 10° and substantially 25° relative to an axis extending substantially perpendicular to the floor of the vehicle.

Clause 18. The support platform of clause 16 or 17, wherein the leg member comprises a curved portion such that the first end of the leg member extends at least partially over the seat of the vehicle and such that the leg axis extends through at least a portion of the seat of the vehicle.

Clause 19. The support platform of any of clauses 16 to 18, wherein the contact point of the foot is located forward of the hinge point in a horizontal direction relative to a bight of the seat of the vehicle.

Clause 20. The support platform of any of clauses 16 to 19, wherein the load leg elevates at least a portion of the carrier base above at least a portion of the seat of the vehicle such that at least a portion of the weight of the child car seat is applied to the load leg.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

For the purpose of facilitating understanding of the invention, the accompanying drawings and description illustrate preferred embodiments thereof, from which the invention, various embodiments of its structures, construction and method of operation, and many advantages may be understood and appreciated.

DETAILED DESCRIPTION OF THE PREFERRED EMBODIMENTS

Figure 1:
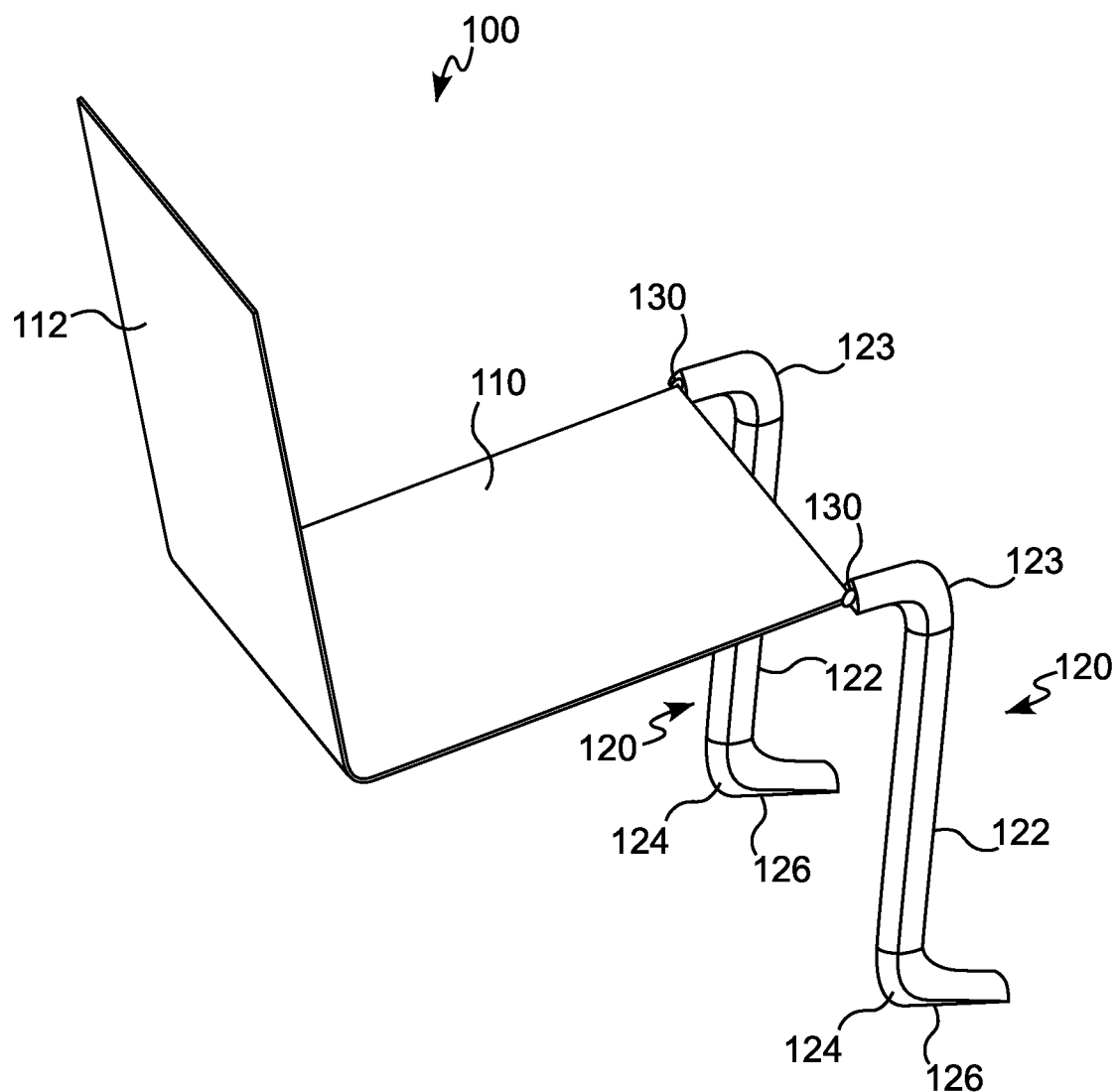
FIG. 1 is a perspective view of a support platform with load legs for a child car seat according to an aspect of the present disclosure.

For purposes of the description herein, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the aspects disclosed herein are not to be considered as limiting.

As used herein, the terms "vehicle" and "automobile" mean motor vehicles for use on public and private roadways, including cars, trucks, sport utility vehicles, and the like. However, the support platform with load legs described in the present disclosure may be equally adapted for use in other varieties of vehicles where securing a child in a car seat is necessary or desired.

The term "front", when used to describe a direction of a vehicle or a direction relative to a vehicle, means the direction in which the vehicle normally travels. The term "rear", when used to describe a direction of a vehicle or a direction relative to a vehicle, means the direction opposite the direction in which the vehicle normally travels.

As used herein, the term "substantially", when used in the context of defining a first angle relative to a second angle, means that the first angle is within 10° of the second angle. For example, the term "substantially perpendicular to" means "within 10° of perpendicular to" or "between 80° and 100° relative to".

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of E, and F. For example, "at least two of D, E, and F" includes one or more of D and one or more of E; or one or more of D and one or more of F; or one or more of E and one or more of F; or one or more of all of D, E, and F.

Aspects of the present disclosure are generally directed to a support platform for a child car seat for use in an automobile and, more particularly, to a support platform including a load leg.

Figure 2:
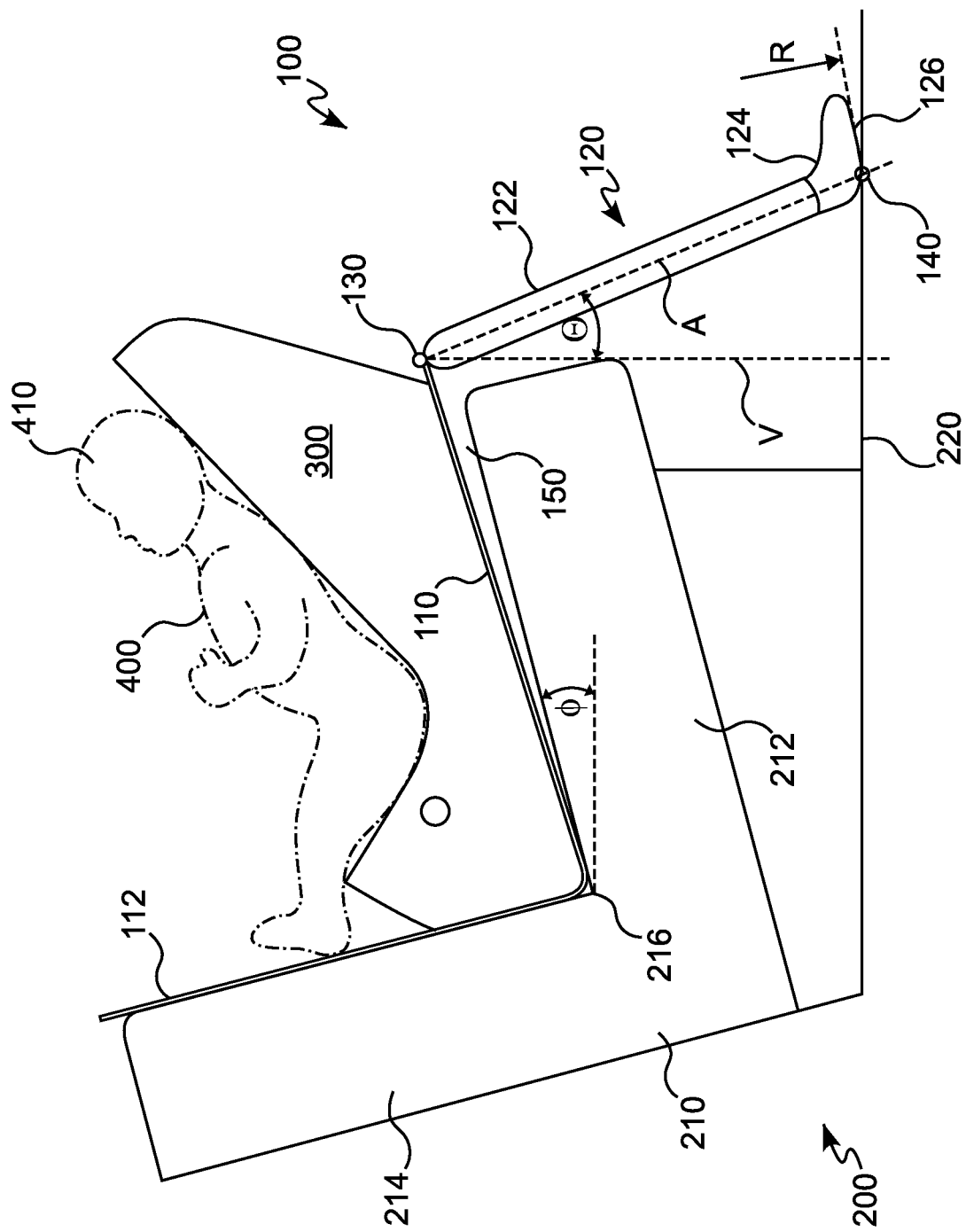
FIG. 2 is a right side view of another support platform with load legs according to an aspect of the present disclosure.

Referring now to FIGS. 1-2, a support platform 100 for a child car seat 300 includes a carrier base 110 adapted to support child car seat 300. In some aspects, a back panel 112 may extend upwardly from the carrier base 110. The child car seat 300 may be a rear-facing seat as shown in the accompanying drawings, or the child car seat 300 may be a convertible seat or any other configuration for restraining a child 400. The support platform 100 is adapted to be installed on a seat 210 of a vehicle 200 such that the joint between the carrier base 110 and the back panel 112 is placed in general proximity to a bight 216 of the seat 210 defined by a bottom cushion 212 and a back cushion 214. When installed, the carrier base 110 rests at least partially on the bottom cushion 212, and the back panel 112 at least partially abuts the back cushion 214. The carrier base 110 and/or the back panel 112 may be secured to the seat 210 via straps, clips, tethers, a seat belt, Lower Anchor and Tether for Children (LATCH) anchors, or combinations thereof. In other aspects, the support platform 100 may not be connected to the vehicle seat 210 by any particular fastening device, but may instead be restrained against the vehicle seat 210 by being compressed between the child car seat 300 and the vehicle seat 210. In such embodiments, movement of the support platform 100 is inhibited by friction between the carrier base 110, the bottom cushion 212, and the child car seat 300, as well as by the physical obstruction of the back panel 112 by the child car seat 300.

With continued reference to FIGS. 1-2, the support platform 100 further includes one or more load legs 120 extending from the carrier base 110 and adapted to engage a floor 220 of the vehicle 200. Each load leg 120 supports the front end of the carrier base 110 and is adapted to transmit any load imparted to the carrier base 110 into the floor 220 of the vehicle 200. The aspects shown in the drawings include two load legs 120, which allow the load legs 120 to be positioned on opposing sides of a tunnel or hump commonly found in the middle of the floor 220 of the vehicle 200. As such, a dual load leg 120 aspect of the support platform 100 may be used in the rear middle seat 210 of the vehicle 200. However, it is to be understood that the support platform 100 described herein may include a single load leg 120 or more than two load legs 120 without departing from the scope and spirit of the disclosure.

Each load leg 120 includes a leg member 122 that is a rigid, generally elongate structure. The leg member 122 is made from a material and has sufficient rigidity to withstand the substantial bending, tensile, and compressive loads imparted to the load leg 120 during an impact or crash, as will be described in greater detail herein. A first end of the leg member 122 is pivotally connected to the carrier base 110 to permit rotation of the load leg 120 relative to the carrier base 110, thereby changing the angle between the carrier base 110 and the load leg 120. The joint between the load leg 120 and the carrier base 110 thus defines a hinge point 130. The hinge point 130 allows a predetermined range of angular displacement between the load leg 120 and the carrier base 110, with the predetermined range of angular displacement corresponding to the various possible installation configurations of the support platform 100 that will be described herein with reference to FIGS. 3-5.

A second end of the leg member 122, opposite the first end, defines or is connected to a foot 124 adapted to frictionally engage the floor 220 of the vehicle 200. The foot 124 may extend forward from the leg member 122 and may include a curved bottom surface 126 which defines a contact point 140 with the floor 220 of the vehicle 200. In some aspects, the foot 124 may be rigidly attached to or integrally formed with the leg member 122. Depending upon the orientation of the support platform 100, and particularly the angle between the load leg 120 and the carrier base 110, the contact point 140 may vary along the length of the foot 124. Accordingly, the bottom surface 126 of the foot 124 allows the load leg 120 to be adjusted relative to the carrier base 110 with the floor 220 remaining tangent to the foot 124 throughout the predetermined range of angular displacement at the hinge point 130. Additionally, the curvature of the bottom surface 126 of the foot 124 allows the foot to roll forward in response to horizontal movement of the carrier base 110 towards the foot 124. The bottom surface 126 may include a tread to increase the coefficient of friction between the foot 124 and the floor 220 of the vehicle 200, thereby preventing slippage of the foot 124 relative to the floor 220.

As shown in FIG. 1, the first end of the leg member 122 may define or include a curved portion 123 which locates the hinge point 130 rearward of the elongate portion of the leg member 122. In this aspect, the hinge point 130 may thus extend over, or overhang, the vehicle seat 210 when the support platform 100 is installed in the vehicle 200. As will be described in greater detail herein, this arrangement allows the support platform 100 to be tucked more closely to the vehicle seat 210 without inhibiting the functionality of the load leg 120. In other aspects, such as is shown in FIG. 2, the load leg 120 may lack the curved portion 123, such that the hinge point 130 is located along or in close proximity to the axis of the elongate portion of the leg member 122.

In the aspect shown in FIG. 2, a leg axis A connecting the hinge point 130 to the contact point 140 defines a leg angle $\theta$ relative to a vertical axis V extending substantially perpendicular to the floor 220 of the vehicle 200. To optimize the transfer of loads from the support platform 100 into the floor 220 of the vehicle 200, while also minimizing slippage of the foot 124, the leg angle $\theta$ may be set within a range of substantially 10° to substantially 25° in a forward direction relative to the vehicle seat 210. However, other values of the leg angle $\theta$ should be understood to be within the scope and spirit of the present disclosure. To facilitate proper adjustment of the leg angle $\theta$ across the possible installation positions of the support platform 100, a radius of curvature R of the bottom surface 126 of the foot 124 may be substantially equal to a linear distance between the hinge point 130 and the contact point 140 along the leg axis A.

As may be appreciated from FIG. 2, the load leg 120 may be positioned in the vehicle 200 such that a gap 150 is defined between the carrier base 110 and the front portion of the bottom cushion 212 of the seat 210. The gap 150 ensures that the load leg 120 is securely engaged with the floor 220 of the vehicle 200, and that the support platform 100 is vertically supported at least partially by the load leg 120 and not entirely by the bottom cushion 212. As the load leg 120 is retained in place by friction between the foot 124 and the floor 220, the load leg 120 must be preloaded to maintain engagement with the floor 220 and to prevent slippage of the foot 124. When installed properly, the weight of the support platform 100, the child car seat 300, and the child 400 contained therein sufficiently preloads the load leg 120 to maintain frictional engagement with the floor 220. However, if the front portion of the carrier base 110 is rested directly on the bottom cushion 212 of the seat 210 such that the gap 150 is not present, the seat 210 may absorb some or all of the weight of the support platform 100, the child car seat 300, and the child 400, resulting in an insufficient preload of the load leg 120. Accordingly, presence of the gap 150 may serve as a visual indication that the support platform 100 is properly positioned with sufficient preload of the load leg 120. In some aspects, an indicator such as a gauge or the like may be provided on the support platform 100 to visually confirm to a user that the gap 150 is present.

Figure 3:
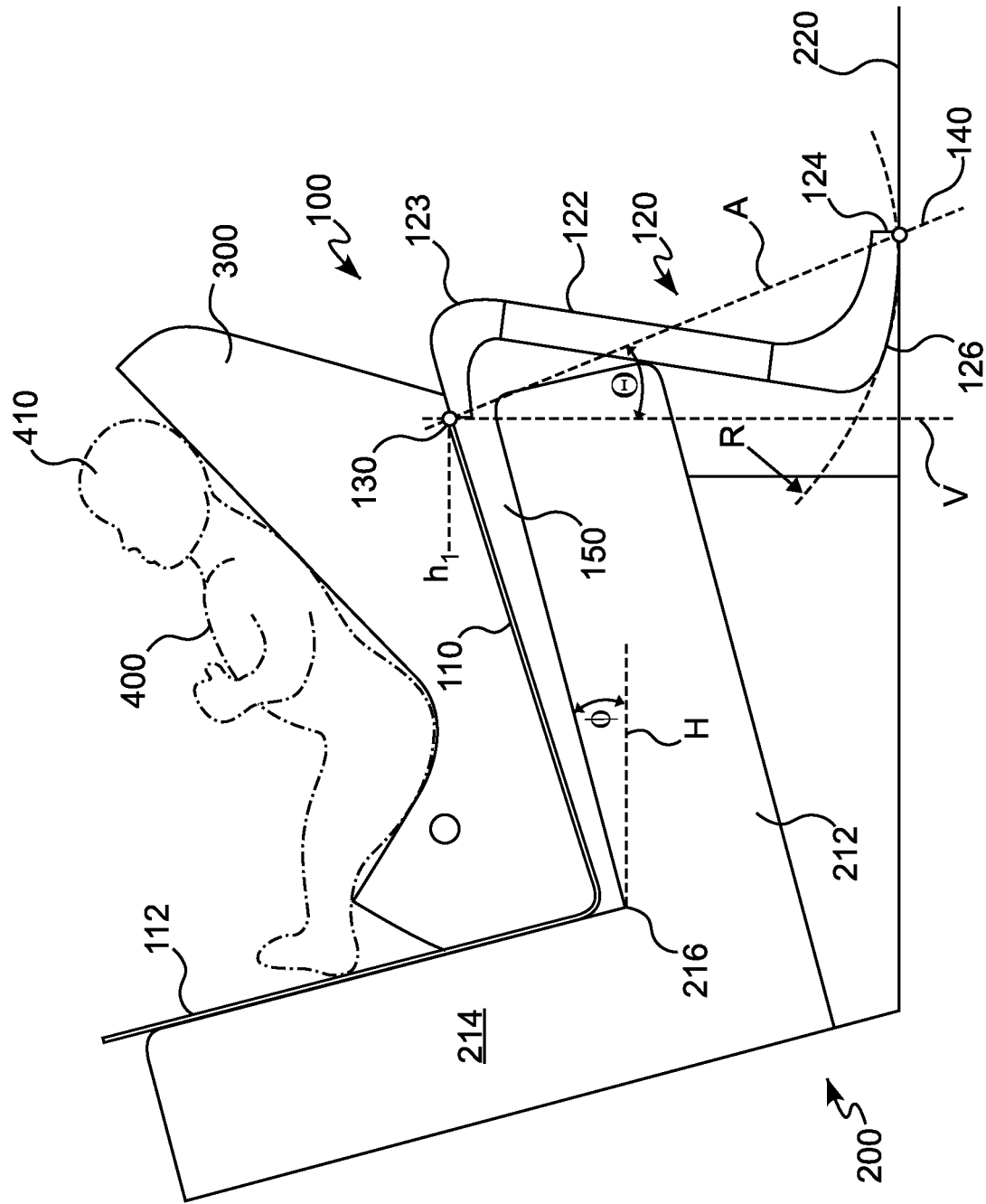
FIG. 3 is a right side view of the support platform with load legs of FIG. 1 installed in a vehicle seat.
Figure 4:
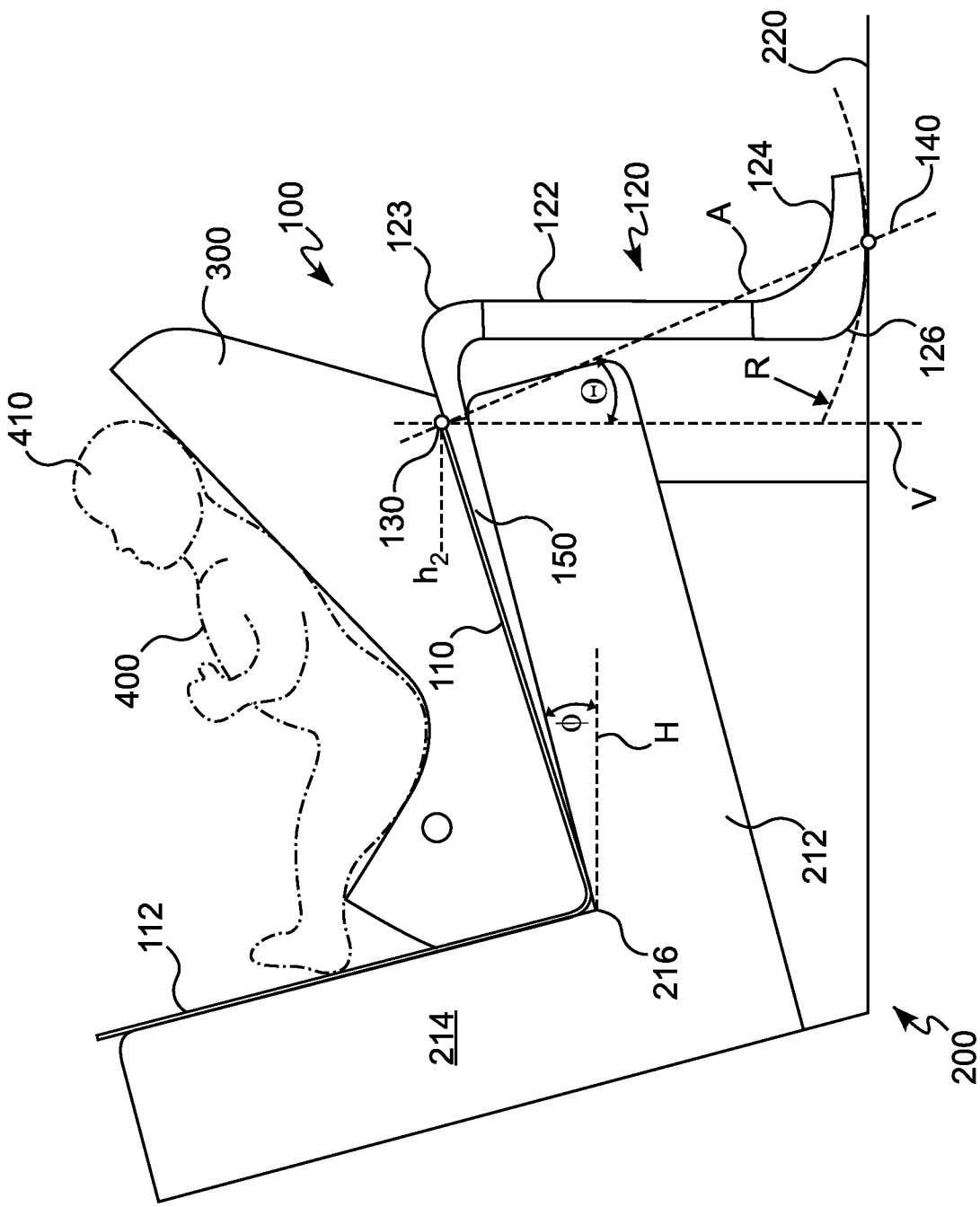
FIG. 4 is a right side view of the support platform with load legs of FIG. 1 installed in another vehicle.
Figure 5:
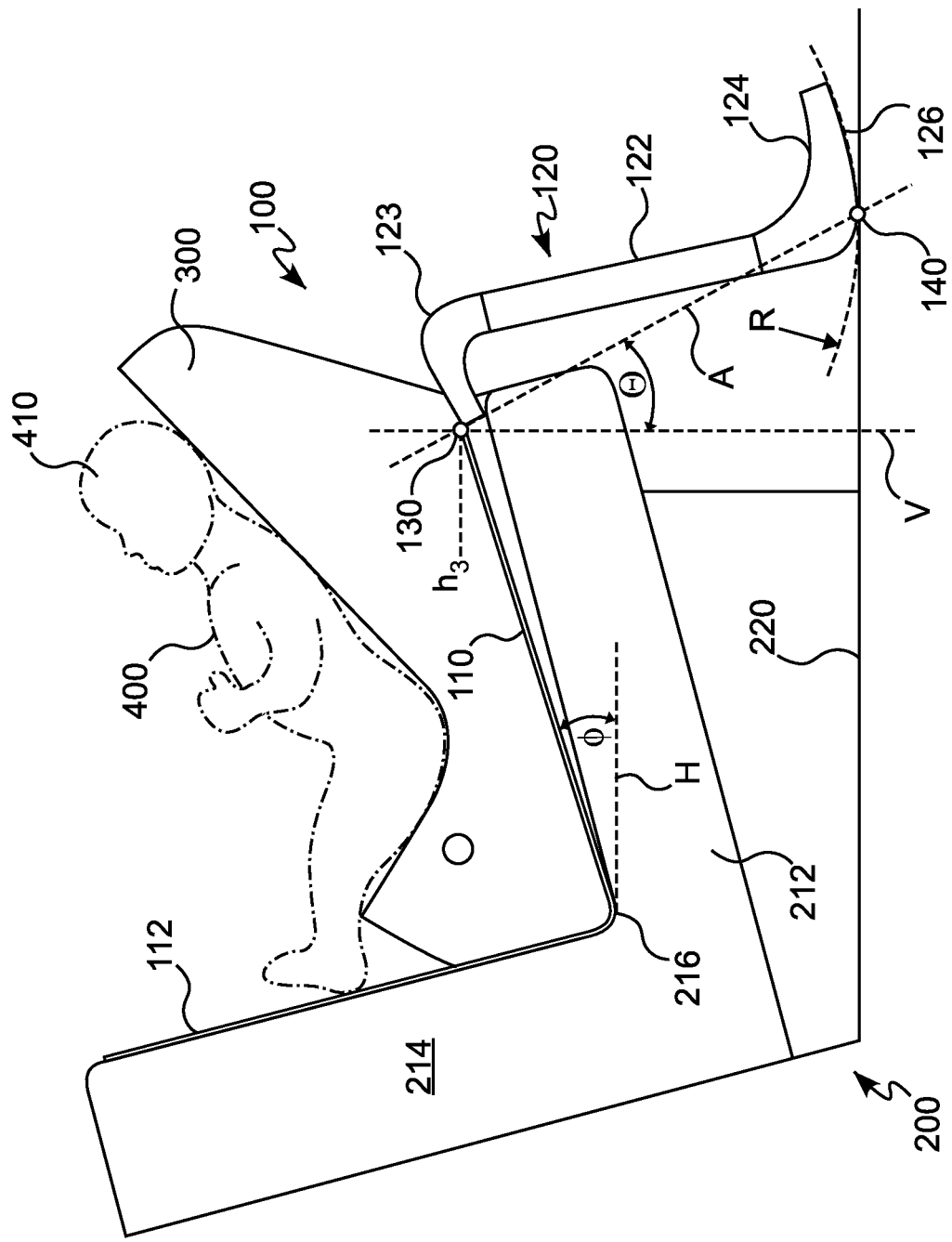
FIG. 5 is a right side view of the support platform with load legs of HU 1 installed in a yet another vehicle seat.

Referring now to FIGS. 3-5, the support platform 100 is depicted in various installed positions to illustrate the adaptability of the support platform 100 to vehicle seats 210 having varying geometry. As discussed above, the hinge point 130 facilitates rotation of the load leg 120 relative to the carrier base 110. This functionality allows the load leg 120 to be rotated to change the point of contact 140 between the foot 124 and the floor 220 of the vehicle 200. This is illustrated in FIGS. 3-5, which show the load leg 120 rotated at different angles relative to the carrier base 110 to define different contact points 140 between the foot 124 and the floor 220. FIG. 3 shows the load leg 120 rotated such that the contact point 140 is defined at a toe section of the foot 124; FIG. 4 shows the load leg 120 rotated such that the contact point 140 is defined at a midsection of the foot 124; and FIG. 5 shows the load leg 120 rotated such that the contact point 140 is defined at a heel section of the foot 124. The radius of curvature R of the bottom surface 126 of the foot 124 may be structured such that the linear distance between the hinge point 130 and the contact point 140 changes depending on the rotation of the load leg 120 relative to the carrier base 110. For example, in FIG. 3, where the contact point 140 is at the toe section of the foot 124, the linear distance between the hinge point 130 and the contact point 140, as measured along the leg axis A, is greater than the linear distance between the hinge point 130 and the contact point 140 of FIGS. 4 and 5. In FIG. 4, where the contact point 140 is at the midsection of the foot 124, the linear distance between the hinge point 130 and the contact point 140, as measured along the leg axis A, is greater than the linear distance between the hinge point 130 and the contact point 140 of FIG. 5. Finally, in FIG. 5, where the contact point 140 is at the heel section of the foot 124, the linear distance between the hinge point 130 and the contact point 140, as measured along the leg axis A, is less than the linear distance between the hinge point 130 and the contact point 140 of FIGS. 3 and 4.

Importantly, regardless of the orientation of the load leg 120 relative to the carrier base 110, the leg angle θ between the leg axis A and the vertical axis V remains substantially constant. That is, the curvature of the foot 124 is such that the leg angle θ is substantially the same in each of FIGS. 3-5, despite the variance in the contact point 140. Moreover, the leg angle θ is substantially the same in any position of the load leg 120 between the specific positions illustrated in FIGS. 3-5. Thus, the optimal leg angle θ of, for example, between substantially 10° and substantially 25°, is maintained throughout the entire range of adjustability of the load leg 120. In some aspects, the leg angle θ remaining substantially constant throughout the entire range of adjustability of the load leg 120 means that the load leg angle θ varies no more than 5° throughout the entire range of adjustability of the load leg 120.

Because the leg angle θ remains substantially the same throughout the range of adjustability of the load leg 120, but the linear distance between the hinge point 130 and the contact point 140 changes throughout the range of adjustability of the load leg 120, the hinge point 130 necessarily changes position depending on the orientation of the load leg 120. As may be appreciated from FIGS. 3-5, the leg axis A defines a triangle along with the vertical axis V and the floor 220 of the vehicle 220. The angle between the vertical axis V and the floor 220 is, by definition, a constant 90° regardless of the orientation of the load leg 120. As discussed above, the leg angle θ likewise remains substantially constant regardless of the orientation of the load leg 120. Therefore, the angles of the triangle are substantially fixed, meaning that an increase in the length of any side of the triangle necessarily requires an increase in the lengths of the other sides. As discussed above, the linear distance along the leg axis A between the hinge point 130 and the contact point 140, which corresponds to one side of the triangle, changes based on the orientation of the load leg 120 relative to the carrier base 110. Thus, changing the orientation of the load leg 120 relative to the carrier base 110 necessarily changes the length of the other sides of the triangle, including the distance between the floor 220 and the hinge point 130. That is, the vertical position of the hinge point 130 relative to the floor 220 changes based on the orientation of the load leg 120 relative to the carrier base 110. In FIG. 3, where the linear distance between the hinge point 130 and the contact point 140 is greatest, the height $h_1$ of the hinge point 130 is higher than the height $h_2$ of the hinge point 130 of FIG. 4 and the height $h_3$ of the hinge point 130 of FIG. 5. Similarly, in FIG. 5, where the linear distance between the hinge point 130 and the contact point 140 is minimized, the height $h_3$ of the hinge point 130 is lower than the height $h_1$ of the hinge point 130 of FIG. 3 and the height $h_2$ of the hinge point 130 of FIG. 4.

The geometry of the support platform 100 may be summarized as follows. The leg angle θ remains substantially constant, and moreover remains at an optimum value, regardless of the orientation of the load leg 120 relative to the carrier base 110. The height h of the hinge point 130 is directly related to the orientation of the load leg 120 relative to the carrier base 110, with each particular orientation of the load leg 120 corresponding to a particular height h of the hinge point 130. Accordingly, the height h of the hinge point 130 may be controlled by adjusting the orientation of the load leg 120. The converse is also true, in that the orientation of the load leg 120 may be controlled by adjusting the height h of the hinge point 130.

The ability to adjust the height h of the hinge point 130 based on the orientation of the load leg 120 relative to the carrier base 110 allows the support platform 100 to be utilized in vehicle seats 210 having different heights and different seat angles (I) relative to a horizontal axis H. Additionally, the ability to adjust the height h of the hinge point 130 based on the orientation of the load leg 120 relative to the carrier base 110 eliminates the need to physically alter the length of the load leg 120 to accommodate different vehicle seat heights. Proper installation of the support platform 100 can thus be achieved simply by positioning the carrier base 110 on the vehicle seat 210 and checking for the presence of the gap 150 to ensure that the load leg 120 is sufficiently preloaded, as discussed above. This positioning of the carrier base 110 on the vehicle seat 210 sets the height h of the hinge point 130, and, consequently, the position of the load leg 120 is automatically adjusted to accommodate the set height h of the hinge point 130. That is, because the height h of the hinge point 130 has been determined based on the position of the carrier base 110, the load leg 120 is forced to assume the position corresponding to the predetermined height h of the hinge point 130. As such, installation of the support platform 100 is simple, and the opportunity for user error is minimal because the load leg 120 automatically adjusts to the proper position, including the optimal leg angle θ, based on the height h of the hinge point 130. To further assist with user installation of the support platform 100, the support platform may include a visual indicator, such as an angle gauge or dial, to confirm that the leg angle θ is within the above-described optimal range.

As may also be appreciated from FIGS. 3-5 the limits of adjustability of the load leg 120 is governed by the length of the foot 124, as well as any physical interference with components of the vehicle 200 and the load leg 120. For example, FIG. 3 shows a limit of adjustability of the load leg 120 in a direction toward the vehicle seat 210, because the contact point 140 is located at an extremity of the foot 124. However, if the foot 124 was to be extended in a direction away from the vehicle seat 210 following the radius of curvature R, further rotation of the load leg 120 would be possible. Similarly, the foot 124 could be extended in a direction towards the vehicle seat 210 following the radius of curvature R to allow further rotation of the load leg 120 away from the vehicle seat 210.

FIGS. 3-5 show an aspect of the support platform 100 similar to the aspect of FIG. 1, which includes a curved portion 123 at the end of the leg member 122 adjacent the hinge point 130. As discussed above with reference to FIG. 1, this arrangement allows the hinge point 130 to extend over, or overhang, the vehicle seat 210 without the load leg 120 interfering with the vehicle seat 210. As is evident especially in FIG. 4, the leg axis A passes directly through a portion of the vehicle seat 210, but the curved portion 123 allows the load leg 120 to avoid the vehicle seat 210. In contrast, if the load leg 120 lacked the curved portion 123 such that the leg member 122 was substantially collinear with the leg axis A, the hinge portion 130 would have to be extended forward so that the leg member 122 would not interfere with the vehicle seat 210. Consequently, the curved portion 123 allows the load leg 120 to more closely follow the contour of the vehicle seat 120 without projecting as far forward on the floor 220 as a substantially straight load leg 120, such as that of FIG. 2. However, the inclusion or omission of the curved portion 123 does not alter the functional geometry of the support platform 100 as discussed above. Accordingly, aspects of support platform 100 which lack the curved portion 123 possess analogous geometric arrangement allowing the load leg 120 to self-adjust to optimize the leg angle θ, as discussed above with reference to FIGS. 3-5.

Figure 6:
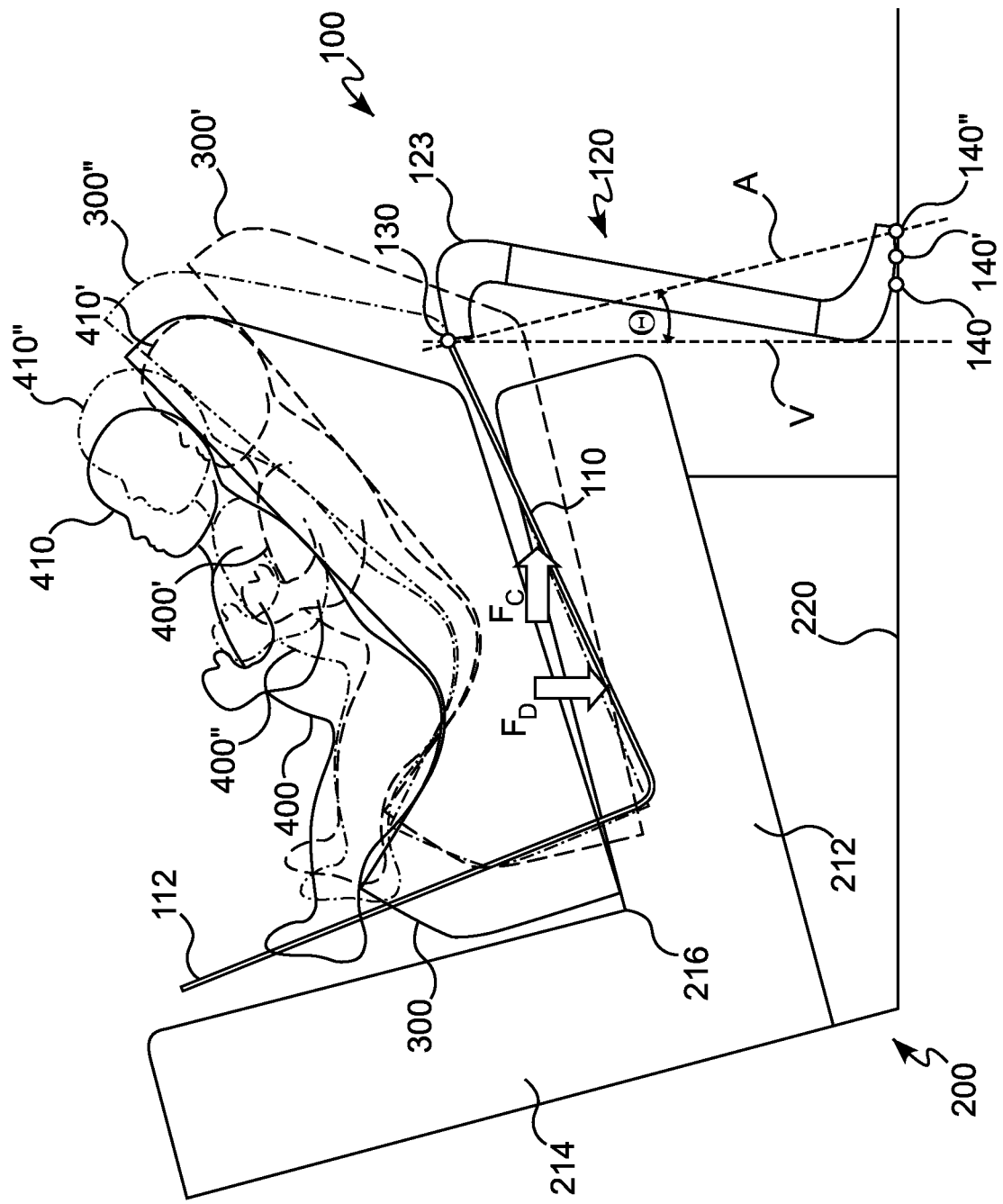
FIG. 6 is a right side view of the support platform with load legs of FIG. 1 installed in a vehicle seat, showing the support platform with load legs in an initial position prior to an impact and two positions during an impact.

FIG. 6 illustrates movement of the support platform 100 during rapid deceleration of the vehicle 200, such as during a frontal impact. FIG. 6 shows the child car seat 300 and the child 400 in three positions: (i) an initial, pre-impact position in which the child car seat, the child, and the head of the child are denoted by the reference numerals 300, 400, and 410, respectively; (ii) a first post-impact position in which the child car seat, the child, and the head of the child are denoted by the reference numerals 300', 400', and 410', respectively; and (iii) a second post-impact position in which the child car seat, the child, and the head of the child are denoted by the reference numerals 300", 400", and 410", respectively. Upon initial deceleration of the vehicle 200 due to an impact, the inertia of the child car seat 300 and the child 400 secured thereto causes the child car seat 300 and the child 400 to continue moving forward, imparting a crash force Fc to the carrier base 110 of the support platform 100. Due to the inclined position of the carrier base 110, a component of the crash force Fc is redirected downwardly through the load leg 120 and into the vehicle floor 220. The downward component $F_L$) of the crash force Fc increases the frictional engagement between the foot 124 of the load leg 120 and the vehicle floor 220 such that the foot 124 is prevented from slipping forward despite the significant crash force Fc applied to the carrier base 110.

Despite the frictional engagement between the foot 124 and the floor 220, slack in the connection between the child car seat 300, the support platform 100, and the vehicle seat 210 allows the carrier base 110 to shift forward away from the bight 216 of the seat 210 as a result of the crash force Fc, as is apparent from FIG. 6. This results in rotation of the load leg 120 relative to the carrier base 110 about the hinge point 130, and causes the foot 124 to roll slightly such that the contact point 140 shifts forward towards the toe of the foot 124 to a first post-impact contact point 140'. This movement of the carrier base 110 causes the child car seat 300' and the child 400' to shift forwards towards the front of the vehicle 200. The hinge point 130 also to shifts forward towards the first post-impact contact point 140', causing the leg axis A to assume a more vertical position relative to the vehicle floor 220. As a result, the hinge point 130 is forced upward, which in turn causes the carrier base 110 to cant.

Continued forward movement of the carrier base 110 causes the foot 124 to roll forward towards the toe of the foot 124 to a second post-impact contact point 140". The hinge point continues to shift forward, causing the leg axis A to assume an even more vertical position relative to the vehicle floor 220 and inducing a further cant to carrier base 110. As a result of the cant in the carrier base 110, the child car seat 300" and the head 410" of the child 400" are lifted upward relative to the initial positions of the child car seat 300 and the head 410 of the child 400. The canting of the carrier base 110 thus redirects some of the horizontal movement of the child 400" into vertical movement, which cushions the child 400" from some deceleration and prevents the head 410" of the child 400" from impacting any structure in front of the head 410", such as another seat of the vehicle. Subsequent to the impact and after the vehicle has completed deceleration, the support platform 100, the child car seat 300 and the child 400 return to their initial positions.

Figure 7:
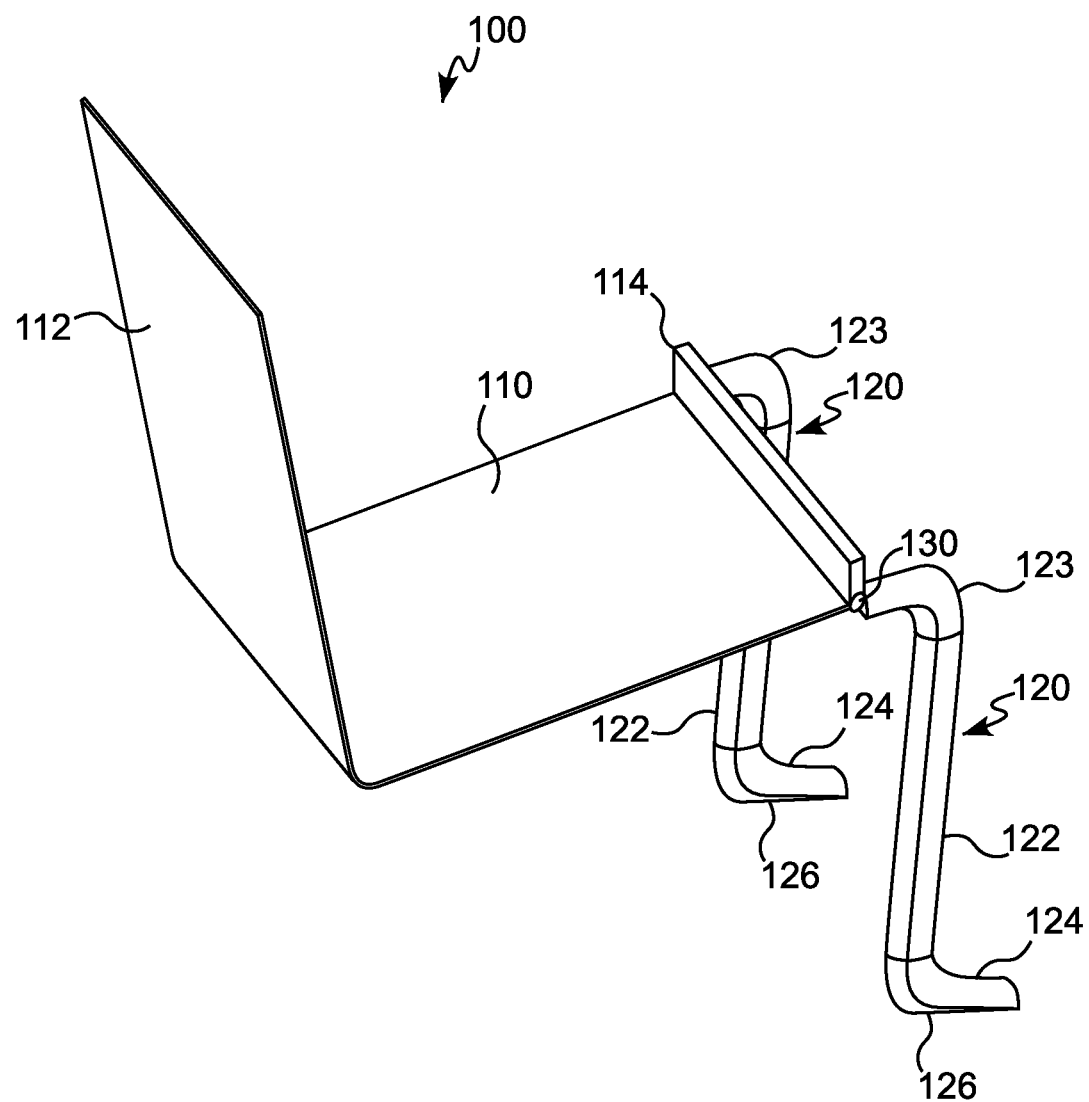
FIG. 7 is a support platform with load legs for a child car seat according to an aspect of the present disclosure.

Referring now to FIG. 7, some aspects of the support platform 100 include a lip 114 affixed to the carrier base 110 to provide additional retention of the child car seat 300 on the support platform 100. Other means for preventing slippage of the child car seat 300 relative to the carrier base 110, such as a treaded surface applied to the carrier base 110, may also be incorporated into the support platform 100.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements. For example, it is to be understood that the present invention contemplates that to the extent possible, one or more features of any embodiment can be combined with one or more features of an other embodiment.

The invention claimed is:

1. A support platform for a child car seat comprising:
a carrier base configured to support the child car seat in a seat of a vehicle; and
a load leg pivotally attached to the carrier base about a hinge point to allow a predetermined range of angular displacement between the load leg and the carrier base, the load leg comprising:
   a leg member having a first end and a second end, the first end of the leg member pivotally connected to the carrier base at the hinge point; and
   a foot extending from the second end of the leg member and having a bottom surface configured to frictionally engage a floor of the vehicle at a contact point defined along the bottom surface of the foot,
wherein a leg axis through the hinge point of the load leg and the contact point of the foot defines a load leg angle of between substantially 10° and substantially 25° relative to an axis extending substantially perpendicular to the floor of the vehicle, and
wherein the load leg is configured to pivot about the hinge point in response to a force applied to the carrier base.

2. The support platform of claim 1, wherein the bottom surface of the foot is curved, and
wherein angular displacement of the load leg relative to the carrier base changes the contact point along the bottom surface of the foot.

3. The support platform of claim 2, wherein the load leg angle varies no more than 5° throughout the predetermined range of angular displacement in installation configurations of the support platform.

4. The support platform of claim 2, wherein the bottom surface of the foot has a radius substantially equally to a linear distance between the hinge point and the contact point of the foot.

5. The support platform of claim 1, wherein the foot is rigidly connected to or integrally formed with the leg member.

6. The support platform of claim 1, wherein the leg member comprises a curved portion between the hinge point and the foot such that the first end of the leg member is configured to extend at least partially over the seat of the vehicle and such that the leg axis extends through at least a portion of the seat of the vehicle.

7. The support platform of claim 1, wherein the bottom surface of the foot comprises a tread to increase friction between the foot and the floor of the vehicle.

8. The support platform of claim 1, further comprising a visual indicator to confirm to a user that the load leg angle is between 10° and 25°.

9. The support platform of claim 1, wherein the contact point of the foot is configured to be located forward of the hinge point in a horizontal direction relative to a bight of the seat of the vehicle.

10. The support platform of claim 1, wherein an angle defined about the hinge point between the carrier base and the leg axis is such that horizontal movement of the carrier base towards the foot causes the hinge point to shift upwards relative to the floor of the vehicle.

11. The support platform of claim 1, wherein the height of the hinge point relative to the floor of the vehicle is adjustable by rotating the load leg about the hinge point relative to the carrier base.

12. The support platform of claim 1, wherein the foot extends from the second end of the leg member in a horizontal direction away from the hinge point.

13. The support platform of claim 1, wherein the load leg elevates at least a portion of the carrier base above at least a portion of the seat of the vehicle such that at least a portion of the weight of the child car seat is applied to the load leg.

14. The support platform of claim 1, further comprising:
an indicator to confirm that a gap is present between at least a portion of the carrier base and the seat of the vehicle.

15. The support platform of claim 1, wherein the carrier base comprises a lip for retaining the child car seat.

16. A support platform for a child car seat comprising:
a carrier base configured to support the child car seat in a seat of a vehicle; and
a load leg pivotally attached to the carrier base about a hinge point to allow a predetermined range of angular displacement between the load leg and the carrier base, the load leg comprising:
a leg member having a first end and a second end, the first end of the leg member pivotally connected to the carrier base at the hinge point; and
a foot extending from the second end of the leg member and having a bottom surface configured to frictionally engage a floor of the vehicle at a contact point defined along the bottom surface of the foot,
wherein angular displacement of the load leg relative to the carrier base changes the contact point along the bottom surface of the foot, and
wherein the load leg angle varies no more than 5° throughout predetermined range of angular displacement in installation configurations of the support platform,
wherein the leg member comprises a curved portion between the hinge point and the foot such that the first end of the leg member is configured to extend at least partially over the seat of the vehicle and such that the leg axis extends through at least a portion of the seat of the vehicle.

17. The support platform of claim 16, wherein a leg axis through the hinge point of the load leg and the contact point of the foot defines a load leg angle of between substantially 10° and substantially 25° relative to an axis extending substantially perpendicular to the floor of the vehicle.

18. The support platform of claim 16, wherein the load leg elevates at least a portion of the carrier base above at least a portion of the seat of the vehicle such that at least a portion of the weight of the child car seat is applied to the load leg.

19. The support platform of claim 16, wherein the contact point of the foot is configured to be located forward of the hinge point in a horizontal direction relative to a bight of the seat of the vehicle.

20. A support platform for a child car seat comprising:
a carrier base configured to support the child car seat in a seat of a vehicle; and
a load leg pivotally attached to the carrier base about a hinge point to allow a predetermined range of angular displacement between the load leg and the carrier base, the load leg comprising:
a leg member having a first end and a second end, the first end of the leg member pivotally connected to the carrier base at the hinge point; and
a foot extending from the second end of the leg member and having a bottom surface configured to frictionally engage a floor of the vehicle at a contact point defined along the bottom surface of the foot,
wherein a leg axis through the hinge point of the load leg and the contact point of the foot defines a load leg angle of between substantially 10° and substantially 25° relative to an axis extending substantially perpendicular to the floor of the vehicle, and
wherein the bottom surface of the foot is curved and the bottom surface of the foot has a radius of curvature substantially equal to a linear distance between the hinge point and the contact point of the foot.

\* \* \* \* \*